2,732,944

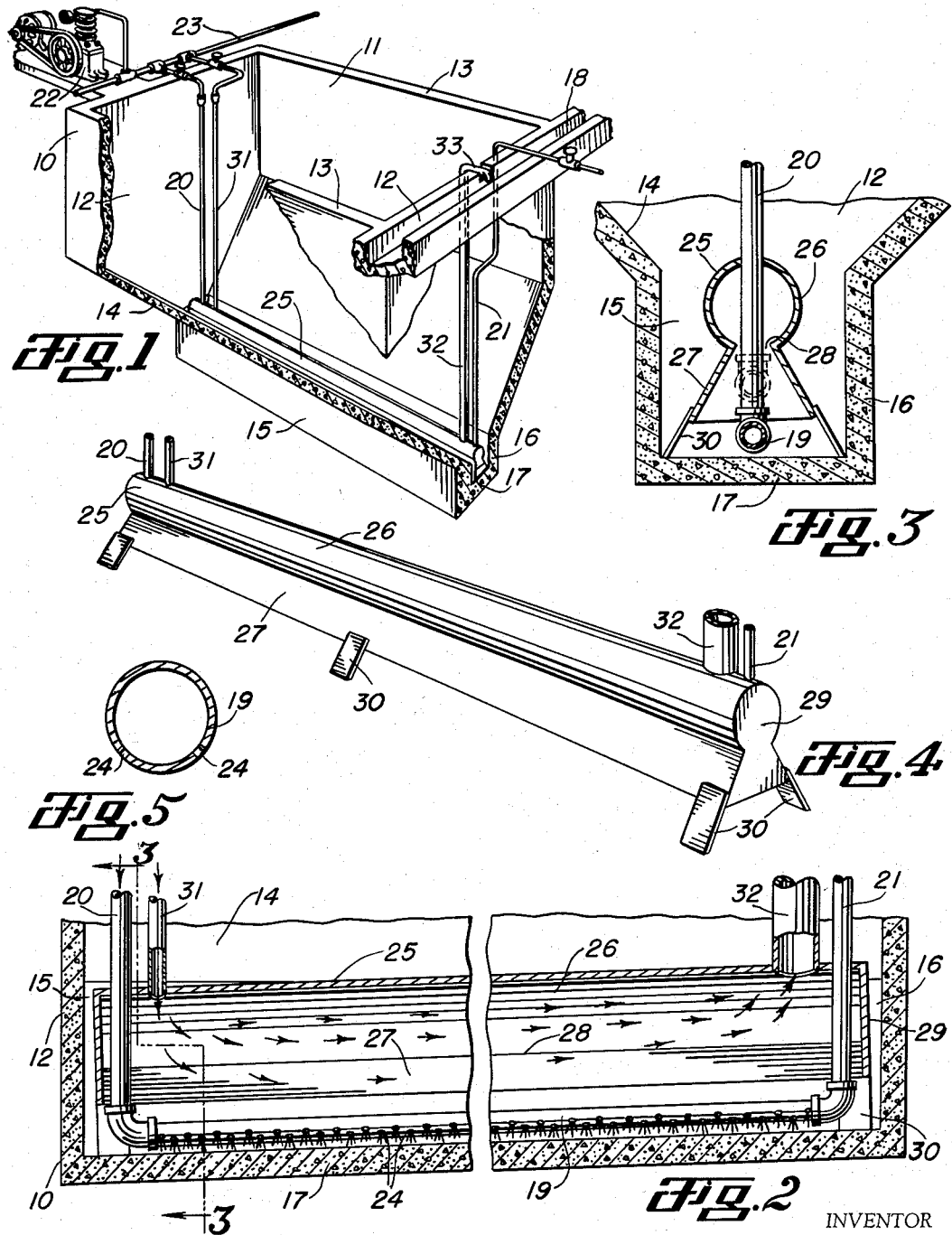
Jan. 31, 1956 — C. C. HAYS — 2,732,944
SLUDGE REMOVING MEANS
Filed April 9, 1952
INVENTOR
Clyde C. Hays
BY
ATTORNEYS even# United States Patent Office 2,732,944
Patented Jan. 31, 1956

SLUDGE REMOVING MEANS

Clyde C. Hays, Waco, Tex.

Application April 9, 1952, Serial No. 281,440

13 Claims. (Cl. 210—55)

This invention relates to new and useful improvements in sludge removing means.

One object of the invention is to provide an improvement in the removal of sludge from the chambers or tanks of sewage or other liquid treating systems.

Another object of the invention is to provide an improvement in the removal of sludge from the bottom of a sewage or other liquid treating chamber or tank wherein the settled sludge is removed by being agitated while being confined and directed to and through a sludge discharge by a current flowing through the confined and agitated sludge.

A further object of the invention is to provide an improved sludge removal means for use in a sewage or other liquid treating chamber or tank having a sludge accumulating sump or means wherein the sludge settled and accumulated therein is removed by being subjected to aeration while being confined against rising in the chamber and wherein the aerated and confined sludge is carried to and through a sludge discharged by a current created by air or gaseous fluid under pressure.

A particular object of the invention is to provide improved sludge removing means, of the character described, which includes jet means for aerating the accumulated sludge, hood means overlying the jet means for confining the aerated sludge and having an outlet and means for delivering air or other gaseous fluid under pressure to the hood means for creating a current therein to pick up and carry said aerated sludge to and through the outlet whereby the sludge removing means functions as an air-lift pump.

Still another object of the invention is to provide an improved sludge removing apparatus, of the character described, which includes a hood extending longitudinally of the sump and having an open lower end spaced from the bottom of the sump to permit the accumulation of sludge, the hood having an inlet at one end and an outlet at its other end to accommodate a flow of air or other gaseous fluid under pressure through said hood, a longitudinal conductor in the lower portion of said hood below the inlet and outlet and having a plurality of orifices for jetting air or other gaseous fluid under pressure in said hood lower portion to agitate and suspend the sludge therein whereby the supended sludge is drawn upwardly and carried to and through the outlet by the flow of air or other gaseous fluid.

A still further object of the invention is to provide an improved sludge removing apparatus of the character described, wherein the outlet end of the hood preferably is slightly elevated to increase the velocity of the air or gaseous fluid sufficiently to create a suction for picking up the aerated and suspended sludge.

A construction designed to carry out the invention will be hereinafter described together with other features of the invention.

The invention will be more readily understood from a reading of the following specification and by reference to the accompanying drawing, wherein an example of the invention is shown, and wherein:

Fig. 1 is a perspective view, partly in section, of a sewage treating tank having a longitudinal sump and provided with sludge removihg means constructed in accordance with the invention, Fig. 2 is a longitudinal, vertical, sectional view of the sump and sludge removing means, Fig. 3 is a transverse, vertical, sectional view, taken on the line 3–3 of Fig. 2.

Fig. 4 is a perspective view of the sludge removing means, and

Fig. 5 is an enlarged, cross-sectional view of the aerator pipe.

In the drawing, the numeral 10 designates a typical tank or vessel of the type employed in the clarification or treatment of liquids, such as water and particularly sewage, and which may be constructed of reinforced concrete or other suitable material. The tank 10 includes an open chamber 11, usually rectangular, formed by upright end and side walls 12 and 13. As shown by the numeral 14, the lower portions of the side walls 13 converge, being inclined inwardly, and are connected by a longitudinal sump 15 for accumulating sludge which settles from the liquid being treated in the chamber 11 and which is directed into the sump by the inclined wall portions. The sump 15 has upright side walls 16 depending from the inclined wall portions 14, a flat bottom wall 17 and its ends are closed by the tank end walls 12. As shown in Fig. 2, the bottom wall 17 usually is inclined whereby one end of the sump is deeper than the other end. A trough 18 is provided at the upper end of one of the tank end walls 12 for receiving and carrying off sludge, as will be hereinafter explained, instead of the sump being provided with the conventional sludge outlet or discharge. It is noted that the present invention is not limited to the illustrated construction of the tank and that such construction is variable.

In removing the sludge accumulated in the sump 15 in accordance with the invention, said sludge is agitated by means of gaseous fluid under pressure and preferably is aerated by air under pressure. A conduit or pipe 19 extends longitudinally of the sump adjacent its bottom wall 17 and the ends of the pipe are connected to inlet conduits or pipes 20 and 21 which extend uprightly of and over the end walls 12. Air or other gaseous fluid under pressure is supplied to the inlet pipe 20, which is at the lower end of the sump, from a compressor or other pressurizing means 22 by a communicating supply line 23. A plurality of jet openings or orifices 24 are formed in the lower portion of the pipe 19 substantially throughout its length and are substantially downwardly directed, as most clearly shown in Fig. 5, for jetting the air or gaseous fluid against the accumulated sludge to aerate or agitate said sludge and cause the same to rise in the sump. Aeration is preferred over agitation since thereby the sludge is suspended by air. The inlet pipe 21 is provided for back flushing or washing the orifices 24 and is adapted to be connected to a source (not shown) of water or other fluid under pressure. Although the pipes 20 and 21 include valves, the same are conventional and need not be described.

For confining the aerated or agitated sludge and the air or other gaseous fluid under pressure emitted by the orifices 24, an accumulator member 25 in the form of an elongate, substantially coextensive hood is mounted in the sump 15 in overlying parallel relation to the pipe 19. As shown by the numeral 26, the upper portion of the hood 25 is substantially cylindrical and has downwardly diverging skirts or side walls 27 depending from each side of a reduced longitudinal opening or throat 28 formed in its bottom (Fig. 3). Upright end walls 29 close the ends of the hood, and a plurality of short legs 30 project downwardly from the skirts 27 for spacing the hood from the sump bottom 17. Thus, the hood does not interfere with the accumulation of sludge. Inlet and outlet conduits or pipes 31 and 32 communicate with and project upwardly from the cylindrical upper portion 26 of the hood adjacent its ends as well as the inlet pipes 20 and 21 which extend through said portion. The inlet pipe 30 is at the lower end of the sump 15 and is connected to the line 23 for receiving and directing air or other gaseous fluid under pressure to and through the hood, and particularly its upper portion 26, to the outlet or discharge conduit 32 (Fig. 2). A double elbow or bend 33 is provided at the upper end of the outlet conduit 32 and discharges into the trough 18, said conduit being of a diameter greater than the diameters of the inlet pipes to accommodate the air or fluid as well as the sludge.

In addition to confining and preventing the aerated or agitated sludge from rising in the chamber 11, the hood confines the air or gaseous fluid emitted thereinto in cooperation with the pressure of the water or liquid in said chamber whereby said air or fluid is directed to the outlet conduit 32. A current or stream is created in the hood between its inlet and outlet by the air or gaseous fluid under pressure directed into said hood by the pipe 31 and, due to the reduced throat 28 as well as the natural tendency of the air or gaseous fluid to rise, the current is confined primarily to the upper portion of said hood. Since the aerated or agitated sludge rises in the hood and is more or less suspended therein, the current picks up and carries the suspended sludge through the outlet conduit and its elbow 33 to the trough 18. In addition to passing through and entraining the suspended sludge, the current draws upwardly and carries off aerated or agitated sludge from the lower and intermediate portions of the hood. This suction action may be provided by increasing the velocity of the current which, preferably, is accomplished by elevating or inclining the top of the hood toward its outlet. Either the sump bottom 17 may be inclined or the hood or its legs 30 may be varied in height to provide the desired elevation or inclination. As shown in dotted lines in Fig. 3, the pipe 19 may be raised from the sump bottom to increase the spread or coverage of the sludge agitation by the jet orifices 24.

From the foregoing, it is readily apparent that an economical and efficient method of and apparatus for removing sludge from a sewage or other liquid treating chamber have been provided. Although other gaseous fluids may be employed for aerating or agitating the accumulated sludge and creating a current to pick up and carry off said sludge, air under pressure is preferred due to its economy, efficiency and availability. It is noted that the principle of an air-lift pump is employed in the sludge removing method and means. As used herein, it is to be understood that the term "gaseous fluid" includes air and other suitable non-liquid fluids.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. Sludge removing means for a sewage or other liquid treating chamber having sludge accumulating means in its bottom including, means disposed in the sludge accumulating means for directing gaseous fluid under pressure against the accumulated sludge to agitate the same, means overlying the sludge accumulating means and pressure fluid directing means to confine the agitated sludge against rising in the chamber, the confining means having an inlet and an outlet, and means supplying gaseous fluid under pressure to the inlet to create a current in said confining means from said inlet to the outlet for picking up the agitated and confined sludge.

2. Sludge removing means for the sludge accumulating means in the bottom of a sewage or other liquid treating chamber including, agitating means disposed in the sludge accumulating means and having a plurality of orifices for discharging gaseous fluid under pressure against the accumulated sludge to agitate the same, hood means having an inlet and an outlet and overlying the agitating means to confine the agitated sludge against rising in the chamber, and means supplying gaseous fluid under pressure to the inlet to create a current in the hood means from said inlet to the outlet for picking up the agitated and confined sludge.

3. Means for removing sludge from the sump means of a sewage or other liquid treating chamber including, a pressure fluid conductor disposed longitudinally in the sump means and having a plurality of orifices for jetting gaseous fluid under pressure against the sludge accumulated in the sump means to agitate said sludge, hood means overlying and substantially coextensive with the conductor and its orifices to confine the agitated sludge against rising in the chamber, the hood means having an inlet at one end and an outlet at its other end, and means supplying gaseous fluid under pressure to the inlet to create a current in said hood means between said inlet and outlet for picking up the agitated and confined sludge.

4. Sludge removing means as set forth in claim 3 including means supplying air under pressure to the conductor whereby the accumulated sludge is aerated and rises in the hood means.

5. Sludge removing means as set forth in claim 4 wherein the orifices are directed substantially downwardly.

6. Sludge removing means as set forth in claim 3 wherein the orifices are directed substantially downwardly.

7. Sludge removing means as set forth in claim 3 wherein the hood means is spaced from the bottom of the treating chamber to permit accumulation of sludge in the sump means.

8. Sludge removing means as set forth in claim 3 wherein the inlet and outlet are at the upper portion of the hood means and air under pressure is supplied to said inlet whereby a current of air is directed through the upper portion of said hood means.

9. An apparatus for removing sludge from the sump means of a sewage or other liquid treating chamber including, aerating means extending longitudinally in the sump means and having a plurality of orifices for jetting air under pressure against the sludge accumulated in the sump means to aerate said sludge, hood means overlying and substantially coextensive with the aerating means and its orifices to confine the aerated sludge against rising in the chamber, the hood means having an inlet at one end and an outlet at its other end, and means supplying air under pressure to the inlet to create a current in said hood means between said inlet and outlet for picking up and carrying the aerated and confined sludge to and through the outlet.

10. A sludge removing apparatus as set forth in claim 9 wherein the hood means includes longitudinal side walls and transverse end walls spaced from the bottom of the chamber to permit the accumulation of sludge in the sump means.

11. A sludge removing apparatus as set forth in claim 9 wherein the outlet is higher than the inlet whereby the velocity of the air current in the hood means is increased sufficiently to create a suction for picking up the aerated and confined sludge.

12. In a sewage or other liquid treating chamber having a sump for accumulating sludge, a sludge removing apparatus including, a longitudinal conductor in the lower portion of the sump having a plurality of substantially downwardly-directed orifices for jetting air under pressure to aerate the sludge accumulated in the sump, an elongate hood in the sump in overlying and coextensive relation to the conductor for confining the aerated sludge, the hood having an open bottom and closed end and side walls spaced from the bottom of the sump to permit the accumulation of sludge, inlet and outlet conductors communicating with the upper portion of said hood at opposite ends thereof, and means supplying air under pressure to the longitudinal and inlet conductors, the air supplied to the latter creating a current in the upper portion of said hood between the inlet and outlet conductors to pick up and carry the aerated and confined sludge to and through the outlet conductor.

13. A sludge removing apparatus as set forth in claim 12 wherein the hood has a substantially cylindrical upper portion with outwardly flaring skirts depending from the sides of its open bottom.

References Cited in the file of this patent

UNITED STATES PATENTS

| | | |
|---|---|---|
| 513,473 | Ball | Jan. 30, 1894 |
| 1,077,476 | Kaibel | Nov. 4, 1913 |
| 1,139,024 | Frank | May 11, 1915 |
| 1,407,258 | Connors | Feb. 21, 1922 |
| 2,146,542 | Hawley | Feb. 6, 1939 |

FOREIGN PATENTS

| | | |
|---|---|---|
| 484,443 | Germany | June 20, 1926 |
| 772,684 | France | Nov. 3, 1934 |